United States Patent [19]

Dressell, Jr. et al.

[11] 4,321,987
[45] Mar. 30, 1982

[54] SHOCK ABSORBER

[75] Inventors: Richard G. Dressell, Jr., Livonia; Robert J. Heideman, Westland, both of Mich.

[73] Assignee: Enertrols, Inc., Livonia, Mich.

[21] Appl. No.: 124,036

[22] Filed: Feb. 25, 1980

[51] Int. Cl.³ ............................................. F16F 9/48
[52] U.S. Cl. ............................ 188/285; 29/156.5 A; 29/156.5 R; 29/525; 29/432; 92/172; 403/282; 403/361
[58] Field of Search .................. 188/284–289; 403/282, 284, 285, 361, 305; 29/525, 156.5 A, 432, 156.5 R; 228/135, 140, 139; 92/172

[56] References Cited

U.S. PATENT DOCUMENTS

| | | | |
|---|---|---|---|
| 1,383,002 | 6/1921 | McIlvried | 29/156.5 A |
| 2,145,168 | 1/1939 | Flagg | 228/135 |
| 2,500,748 | 3/1950 | Grant | 29/525 |
| 3,354,791 | 11/1967 | Wahlmark | 29/156.5 R |
| 4,059,175 | 11/1977 | Dressell, Jr. et al. | 188/285 |
| 4,156,793 | 5/1979 | Carlson | 403/282 |

FOREIGN PATENT DOCUMENTS 2055272 12/1978 Fed. Rep. of Germany ...... 403/282

*Primary Examiner*—Bernard Nozick
*Attorney, Agent, or Firm*—Krass, Young & Schivley

[57] ABSTRACT

A hydraulic shock absorber is disclosed of the type including a piston slidably mounted in a cylinder, with a metering sleeve defining variable area orifices utilized to produce variable resistance to movement of the piston in the cylinder. The shock absorber structure includes a piston having two piece construction with head and rod components brazed together into a unitary assembly, as well as a bearing sleeve retainer for the piston rod bearing formed in three separate pieces in order to provide relatively reduced manufacturing costs of these components over one piece construction.

5 Claims, 7 Drawing Figures

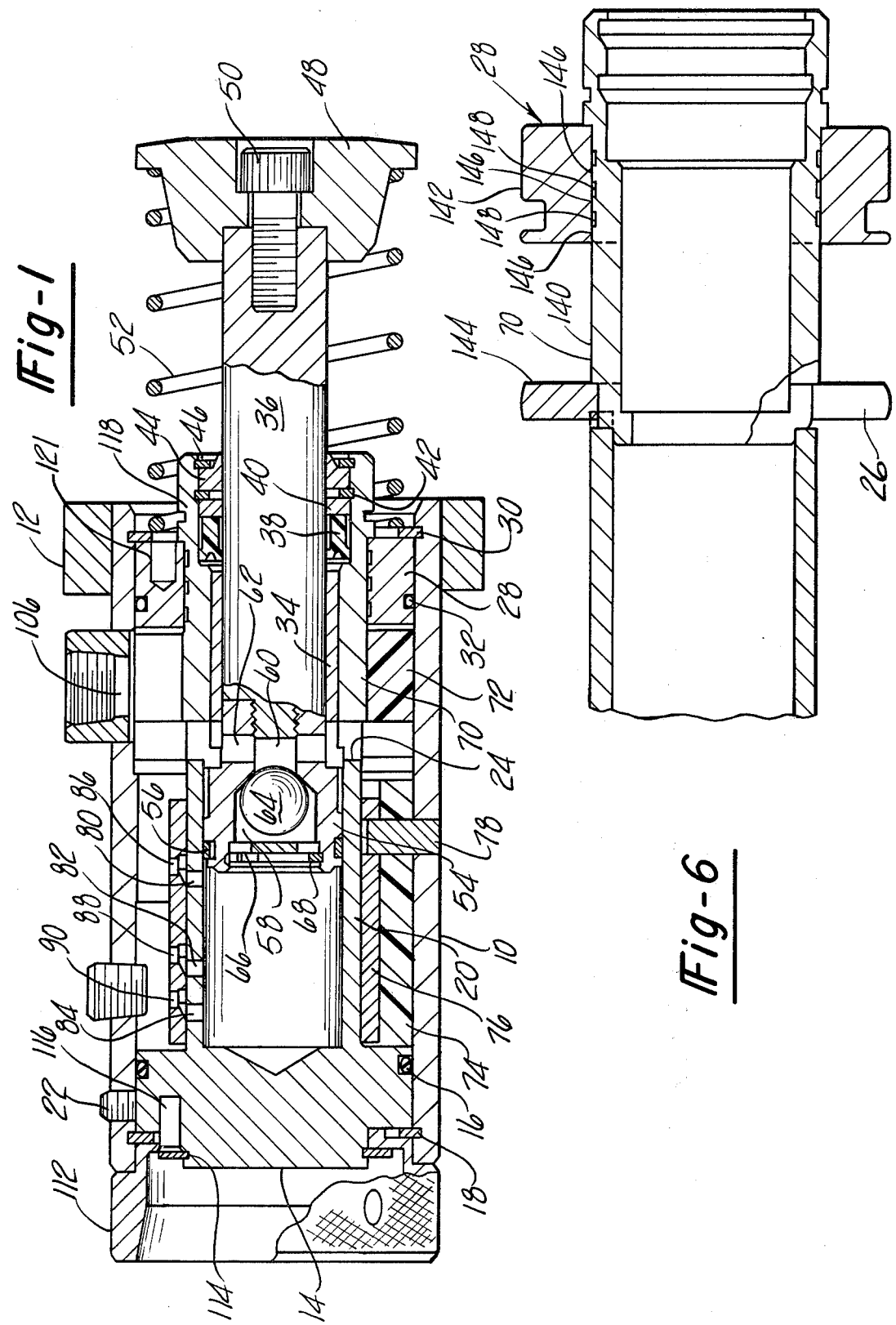

SHOCK ABSORBER

BACKGROUND DISCUSSION

A common shock absorber arrangement includes a piston slideably disposed in a cylinder, with hydraulic fluid displaced through a series of orifices by movement of the piston in the cylinder to absorb shock loads and generate viscous damping. Such shock absorbers are employed in applications such as machine tool stops to absorb the momentum of moving machine tool parts as they are brought to a stop.

One such shock absorber arrangement is disclosed in U.S. Pat No. 4,059,175. The shock absorber disclosed therein includes a piston member having a relatively large diameter piston head and a relatively small diameter piston rod which is slideably mounted within a bearing sleeve retainer configured with two spaced large diameter sections thereof and an intermediate and end sections of relatively small diameter. Both the piston and bearing sleeve retainer are constructed of a single unitary piece.

These parts, being required to withstand relatively high pressure forces, are machined from solid steel bar stock. The relatively large volume of material which must be machined away to form the finished parts represents a considerable wastage of material, contributing significantly to the cost of these components. It would therefore be advantageous if such components could be manufactured so as to reduce the overall cost of the shock absorber, by eliminating such material wastage.

Accordingly, it is an object of the present invention to provide a shock absorber of the type including a piston and rod assembly slideably mounted within a cylinder chamber, with the piston of two piece construction with separate head and rod portions thereof joined together in order to reduce the cost of manufacturing the shock absorber assembly.

A still further object of the present invention is to provide a shock absorber of the type including a bearing sleeve retainer, which bearing sleeve retainer has various diameter sections, which is of three piece construction rather than one piece construction, in order to reduce substantially the manufacturing cost of the component.

Yet another object of the present invention is to provide a manufacturing technique for press fitting separate elements into a single unitary high strength component suitable for use in such shock absorber application.

SUMMARY OF THE INVENTION

These and other objects of the present invention which will become apparent upon a reading of the following specification and claims are achieved by constructing both the piston and rod assembly as well as the bearing sleeve retainer of multipart construction. Each of the parts constituting those sections of the assembly are of greater or lesser diameter; i.e., in the case of the piston and rod assembly, the larger diameter head portion is constructed of a separate piece and a small diameter rod. The head and rod are formed with mating sections pressed fitted together and brazed at the interface. This saves the material represented by the difference in diameter of the rod and head assembly.

In order to facilitate the press fitting of a plug portion of the rod into a bore in the piston head, a series of spaced grooves are machined into the outside diameter leaving spaced lands, which are pressed into the bore formed in the piston head. The clearance spaces or grooves intermediate the lands provide spaces into which the material can be deformed to facilitate the press fitting step.

In similar fashion, a three piece bearing sleeve retainer is provided including a relatively small diameter machined sleeve receiving a pair of spaced larger diameter collars that have sharp press fit over the outside diameter of the sleeve to facilitate the press fitting step. A similar substantial reduction of the material required in manufacturing the finished assembly is thus realized.

The resultant shock absorber exhibits the functional advantages that are described in U.S. Pat. No. 4,059,175 while a reduction in manufacturing costs are achieved.

BRIEF DESCRIPTION OF THE DRAWINGS

FIG. 1 is a partial sectional view of a shock absorber according to the present invention, the section taken along the longitudinal axis thereof.

FIG. 6 is a view in partial section of the bearing sleeve retainer element incorporated in the shock absorber assembly shown in FIG. 1.

Figure 7:
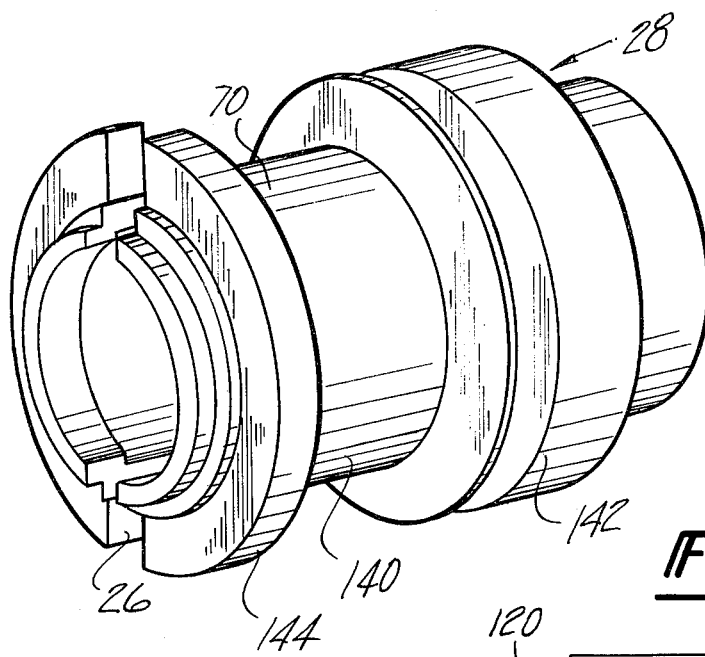
FIG. 7 is a perspective view of the end of the bearing sleeve retainer.
Figure 3:
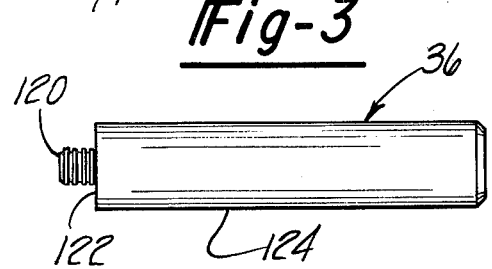
FIG. 3 is a view of the rod blank incorporated in the piston assembly shown in FIG. 2.

In the following detailed description certain specific terminology will be employed for the sake of clarity, and a particular embodiment described in accordance with the requirements of 35 USC 112. However, it is to be understood that the same is not intended to be limiting and should not be so construed inasmuch as the invention is capable of taking many forms and variations within the scope of the apended claims.

Referring to the drawings, the arrangement of components of the shock absorber according to the present invention is similar to that described in aforementioned U.S. Pat. No. 4,059,175, which is construed about a cylindrical tube 10. One end of the tube, which will be hereafter termed the forward end, has a radially extending metal flange 12 fixed to its outer diameter for the purpose of attaching the shock absorber to a part mounting surface, such as the wall 13 of FIG. 1.

The rear end of the tube 10 is closed off by a cylindrical cap 14. An O-ring 16 fitted in a groove of the outer perimeter of the rear cap 14 bears against the inner wall of the tube 10 to provide a fluid seal. A split steel retaining ring 18 fits in a groove in the inner wall of the tube 10 to secure the cap within a tube.

A tubular metering cylinder 20 is formed integrally with the rear cap 14 and projects forwardly into the tube 10. The outer diameter of the cylinder 20 is substantially smaller than the inner diameter of the tube 10 so that a volume is formed therebetween.

The rear cap 14 and cylinder 20 are normally secured against rotation within the tube by a set screw 22 which mates with a threaded hole in the wall of the tube, near the rear end, and bears against the outer diameter of the rear cap 14.

A pair of tabs or ears 24 project outwardly from the forward end of the cylinder 20. The tabs are not quite diametrically opposed but are displaced from one another by approximately 140° so that a wider spacing separates the two on one side than on their other side. The tabs 24 extend into a pair of radial slots 26 formed in the rear end of a piston rod bearing retainer 28 which seals the forward end of the tube 10. The retainer 28 is secured within the tube by a split retainer ring 30 fitted in a groove in the inner diameter of the tube 10, near its forward end. An O-ring seal 32 fits in a groove in the outer diameter of the retainer 28.

A cylindrical sleeve bearing 34 is press-fitted within a central cavity in the retainer 28 and acts to slidingly support an elongated piston rod 36 that projects out of the forward end of the assembly. The retainer 28 has a forward cylindrical extension beyond the sleeve bearing 34 to accommodate a plastic rod seal 38. The rod seal 38 bears against a shoulder formed in the retainer 28 and is secured by a retainer member 40 which is in turn secured between the retaining ring 42 and a second retainer ring 46 fitted within another groove in the retainer 28.

At its forward end, the piston rod 36 carries a button 48 secured by a screw 50 threaded in a hole at the end of the piston rod. The button 48 acts to bear against a machine part to be controlled by the decelerator. A spiral spring 52 extends between the rear side of the button 48 and the retainer ring 30 and acts to return the piston rod 36 to its normal extended position after the machine part is moved away from the unit.

A piston head 54 is secured to be integral with the rear end of the piston rod 36 as will be described hereinafter in more detail. A groove on the outer diameter of the rear end of the piston carries a piston ring 56 which bears against the inner diameter of the cylinder 20. The piston is formed with a central aperture 58 opening on its rear end and communicating at its forward end with a central cavity 60. That in turn communicates with a radially extending aperture 62. The concave surface between the central aperture 58 and the smaller aperture 60 acts as a seat for a ball check valve 64. A valve retainer 66 is supported rearwardly of the ball by a retaining ring 68. When the piston moves rearwardly under the influence of a force exerted on the button 48 by a machine part, the central cavity 60 is sealed by the ball check valve 64 and, when the piston moves in the forward direction under the force of the spiral spring 52, a free flow path is established through the apertures 58, 60 and 62.

The aperture 62 communicates with the radial slots 26 in the rear end of the retainer 28 and through those slots to an annular slot 70 formed in the outer diameter of the retainer. The annular slot 70 is filled with an annular accumulator pad 72 formed of a cellular plastic filled with nitrogen to give it a high degree of resilience.

A similar accumulator pad 74 is disposed within the inner diameter of the tube 10, forwardly of the rear cap 14, surrounding the cylinder 20. This accumulator system also has fluid communication with the radial slot 26.

A sleeve 76 surrounds the outer diameter of the cylinder 20 and has its outer surface in contact with the inner diameter of the accumulator pad 74. The sleeve 76 is locked in position relative to the tube 10 by a pin 78 extending radially inward from the outer wall of the tube and passing through a hole formed in the accumulator pad 74.

Three fluid ports 80, 82 and 84 are formed radially through the wall of the cylinder 20. The three ports are in longitudinal alignment with one another and the spacing between the ports 80 and 82 is greater than the spacing between the ports 82 and 84. More than three ports may be employed in alternative embodiments and generally the spacings are arranged at exponentially decreasing distances in the direction of the rear of the cylinder. The ports are circular in cross section.

The fluid ports 80, 82 and 84 are located adjacent to three encircling ring grooves 86, 88 and 90 formed into the interior surface of the sleeve 76. These three ring grooves 86, 88 and 90 are spaced along the length of the sleeve 76 at the same spacing as the fluid ports 80, 82 and 84 so that when the sleeve 76 is disposed over the cylinder 20, the grooves overlie, to some degree, the respective ports. The extend to which they overlie the ports is controlled by the rotational or angular relationship of the sleeve 76 with respect to the cylinder 20.

The angular orientation of the cylinder 20, relative to the sleeve 76, which is fixed within the tube 10 by the pin 78, may be adjusted by means of an externally knurled cylindrical adjustment member 112 that may be attached to the rear cap 14 by a split ring 114. A pin 116 passes through adjustment member 112 to align it in a hole in the rear cap 14.

Alternatively, the same adjustment member may be attached to the front end of the retainer 28 through use of the ring groove 118 and a pin socket 121. The adjustment member 112 may be removed to prevent undesired readjustment of the orifice size.

The tube 10 is equipped with a port 106 in its sidewall, which communicates with the interior volume adjacent the accumulator pad 72. This port may be plugged so as to restrain the fluid flow within the tube 10 or it may be used to connect the interior volume to an external accumulator. This arrangement allows for a more efficient dissipation of the heat induced in the hydraulic fluid as a result of the energy absorbed from the decelerating member.

As described in the aforementioned Pat. No. 4,059,175, the geometry of the grooves 86, 88 and 90 and the ports 80, 82 and 84 is such as to produce an advantageous result in that the restriction to flow through these openings produces a turbulent flow restriction, in turn offering certain advantagous characteristics of the shock absorber. Inasmuch as the details concerning this aspect of the shock absorber do not form a part of the present invention, a detailed description is not here set forth.

Figure 4:
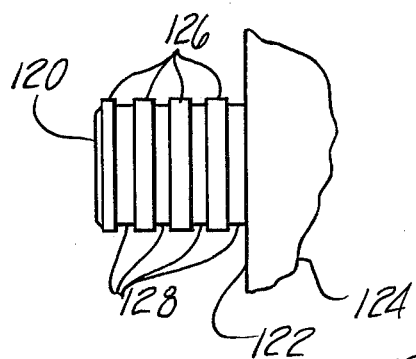
FIG. 4 is an enlarged fragmentary view of the plug portion of the rod blank shown in FIG. 3.
Figure 2:
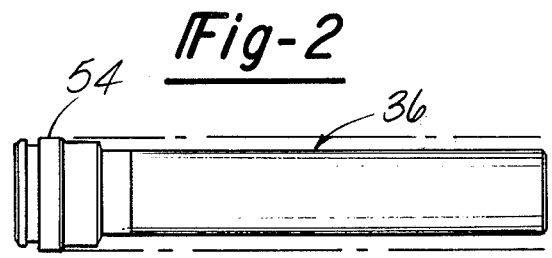
FIG. 2 is a reduced size view of the piston assembly incorporated in the shock absorber of FIG. 1.
Figure 5:
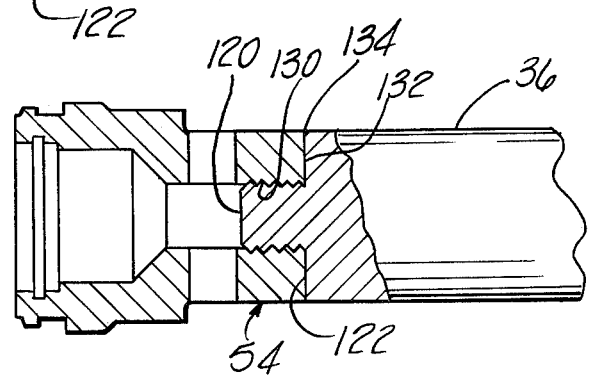
FIG. 5 is an enlarged fragmentary sectional view of the piston head and rod assembly.

By reference to FIGS. 2-5, one aspect of the improved shock absorber according to the present invention may be described and consists of the piston head 54 and rod 36 being formed of a two part construction. The head portion of the piston head 54 may have a larger diameter than the rod section 36 requiring the machining away of the volume of material represented by the phantom lines in FIG. 2. Accordingly, the piston head 54 and rod 36 are formed of a two part construction, achieved by machining the rod section 36 shown in FIG. 3 with a reduced diameter plug 120, forming a shoulder 122 on the body portion 124. The end plug 120 as best seen in FIG. 4 is formed with a series of lands 126 forming intermediate grooves 128. The diameter of the plug section 120 over the lands 126 is such as to be press fit in the interior of the bore 130 formed in the piston head 54. The plug section 120 is then press fit into the bore 130 with the end face 132 of the piston head 54 seated against the shoulder 122. The press fitting insures a stable positioning of the piston head 54 on the piston rod prior to brazing operation such that the entire assembly may be placed in a brazing oven in the manner well known in the art to form a brazed joint intermediate the shoulder 122 and the end face 132.

Accordingly, the piston head 54 and rod 36 while being of two piece construction, the resulting part is of adequate strength for resisting the relatively high forces imposed on the assembly.

The machining of lands and grooves on the plug 120 enables the press assembly to be secured while at the same time not requiring relatively high seating forces to be applied to the respective parts. The grooves allow movement of deformed material from the lands into the grooves and also reduce the volume of steel required to be compressed in order to provide the press fit.

A similar approach is realized in constructing the bearing retainer sleeve 28 as indicated and can be seen in FIG. 6. That is the bearing sleeve retainer 28 is a three part construction including a bearing face sleeve component 140, of relatively small diameter, and a first collar component 142 and a second collar component 144 of relatively large diameter. Each of the collars 142 and 144 are placed over machined outside diameters of the sleeve 140 with an axial space therebetween to define an annular space 70. The outside diameter adjacent over which the collar 142 is placed may be provided with lands 146 and grooves 148 in order to enable the press fitting of the parts together. The press fitting enables the secure positioning of the collars during a brazing joinder of the collars to the sleeve 140, creating brazed joints therebetween in order to provide a unitary construction of the bearing retainer sleeve 28.

Accordingly, it can be appreciated that the material ordinarily removed in order to provide the annular space 70 and the reduced end diameter of this sleeve beyond to the right of the collar 142 are not required to be machined from solid bar stock, and a substantial saving in material is afforded by this construction.

The embodiments of the invention in which an exclusive property or privilege is claimed are defined as follows:

1. A shock absorber comprising:
   a tubular cylinder defining a fluid pressure chamber therein;
   a piston having a piston head slidably fit within said cylinder;
   means for causing flow of fluid into and out of said cylinder in response to movement of said piston head in said cylinder in respective directions therein;
   means slidably mounting said piston for said slidable movement in said cylinder;
   said piston further including a rod portion of smaller diameter than said piston head, said rod portion extending out of said cylinder and exteriorly of said shock absorber;
   said piston and rod being of two piece construction and including means for connecting said piston head and rod together to form a unitary member;
   said connecting means including a bore defined in one of said piston head and rod and a plug on the other of said piston head and said rod, said plug being insertable in interference relationship within said bore and including a plurality of alternately disposed circumferential lands and grooves thereon, the diameter of said lands being greater than the diameter of said bore whereby at least portions of said lands are deformed by the walls defining said bore upon insertion of said plug into said bore, the diameter of said grooves being less than the diameter of said bore whereby to provide clearance spaces between said plug and said walls within which said deformed portions of said lands may be received.

2. The shock absorber according to claim 1, wherein said means slidably mounting said piston includes a shock absorber housing and a bearing retainer sleeve mounted in said housing,
   said housing being of generally cylindrical elongate shape,
   said bearing sleeve retainer being mounted at one end of said housing,
   and further including a sleeve bearing mounted within said bearing sleeve retainer slidably receiving said piston rod to thereby mount said piston rod for slidable movement therein,
   said bearing sleeve retainer being of generally cylindrical shape and including a sleeve component and two collar sections axially spaced with a reduced diameter section therebetween defining an annular groove,
   said means for causing fluid flow into and out of said cylinder including a slot formed in one of said collar sections extending in communication with said annular groove,
   said piston head including transverse openings establishing through communication with a central bore formed in said piston head, and
   means securing each of said collar sections in said axially spaced locations on said bearing sleeve retainer.

3. The shock absorber according to claim 2, wherein said bearing retainer sleeve is formed with a section of circumferential lands and grooves and at least one of said collar sections is press fitted over said lands and brazed to said sleeve component.

4. A shock absorber comprising:
   a tubular cylinder defining a fluid pressure chamber therein;
   a piston slidably disposed within said cylinder;
   means for producing flow of fluid into and out of said cylinder in response to the movement of said piston;
   means for slidably mounting said piston within said cylinder, including—
   (1) an elongate shock absorber housing,
   (2) a bearing sleeve retainer mounted at one end of said housing,
   (3) a sleeve bearing mounted within said bearing sleeve retainer and slidably receiving said piston rod to thereby mount said piston rod for slidable movement, said bearing sleeve retainer being generally of cylindrical shape and including two descrete collar sections axially spaced with a reduced diameter section therebetween defining an annular groove,
   said bearing sleeve retainer including a sleeve member having said collar sections sleeved thereover;
   means for mounting said collar sections on said sleeve member,
   said sleeve member and one of said collar sections including opposing lands and grooves defined therein, portions of the lands being deformed and received within the grooves,
   said means for producing fluid flow into and out of said cylinder including a slot formed in one of said collar sections and communicating with said annular groove, said piston head including transverse openings therein establishing through communication with a central bore formed in said piston head.

5. The shock absorber according to claim 4, wherein at least one of said collar sections is brazed to said sleeve member.

* * * * *